United States Patent
Wedekamp

(12) 
(10) Patent No.: US 6,576,189 B1
(45) Date of Patent: Jun. 10, 2003

(54) DEVICE AND METHOD FOR EXPOSING LIQUIDS, INCLUDING PRETREATED WASTEWATER, TO X-RAYS

(75) Inventor: Horst Wedekamp, Herford (DE)

(73) Assignee: Wedeco AG Water Technology, Düsseldorf (DE)

( * ) Notice: Subject to any disclaimer, the term of this patent is extended or adjusted under 35 U.S.C. 154(b) by 0 days.

(21) Appl. No.: 09/486,027
(22) PCT Filed: Sep. 17, 1998
(86) PCT No.: PCT/DE98/02760
§ 371 (c)(1), (2), (4) Date: Feb. 18, 2000
(87) PCT Pub. No.: WO99/14161
PCT Pub. Date: Mar. 25, 1999

(30) Foreign Application Priority Data

Sep. 18, 1997 (DE) .......................... 197 40 986

(51) Int. Cl.⁷ .............................. A61L 2/10; A61L 2/08
(52) U.S. Cl. .......................... 422/23; 422/24; 422/186.3
(58) Field of Search ............................ 422/23, 24, 186, 422/186.3

(56) References Cited

U.S. PATENT DOCUMENTS 4,367,410 A   1/1983   Wood
5,124,131 A * 6/1992   Wekhof .................... 422/186.3

FOREIGN PATENT DOCUMENTS

| DE | 41 34 711 | 4/1993 |
| DE | 42 06 596 | 9/1993 |
| EP | 0 317 735 | 5/1989 |
| WO | WO94/20208 | 9/1994 |
| WO | WO 94/20208 | * 9/1994 |

* cited by examiner

Primary Examiner—Robert J. Warden, Sr.
Assistant Examiner—Sean E. Conley
(74) Attorney, Agent, or Firm—Collard & Roe, P.C.

(57) ABSTRACT

The invention relates to a device for exposing liquids to X-rays, which, seen in the direction of flow, comprises an intake chamber (16), an X-ray chamber (18) and a discharge chamber (20). The X-ray chamber has X-ray sources (36) which are either aligned in rows and/or stacked parallel to the flow (14). The device is designed as a channel with open top (10), and a containment wall (24) is provided across the direction of flow (14), between the intake chamber and the X-ray chamber. The containment wall (24) is sized so as to cover part of the channel cross-section, while the lower edge of the containment wall (24) is located at a distance of the channel base (12). The outlet opening (22) thus formed is so sized that, in case of a flow rate increase and starting from a flow rate of 1 m/sec, the liquid accumulates in front of the outlet opening (22), resulting in the liquid level in the intake chamber (16) being higher than in the X-ray chamber (18).

9 Claims, 2 Drawing Sheets

Figure 1:
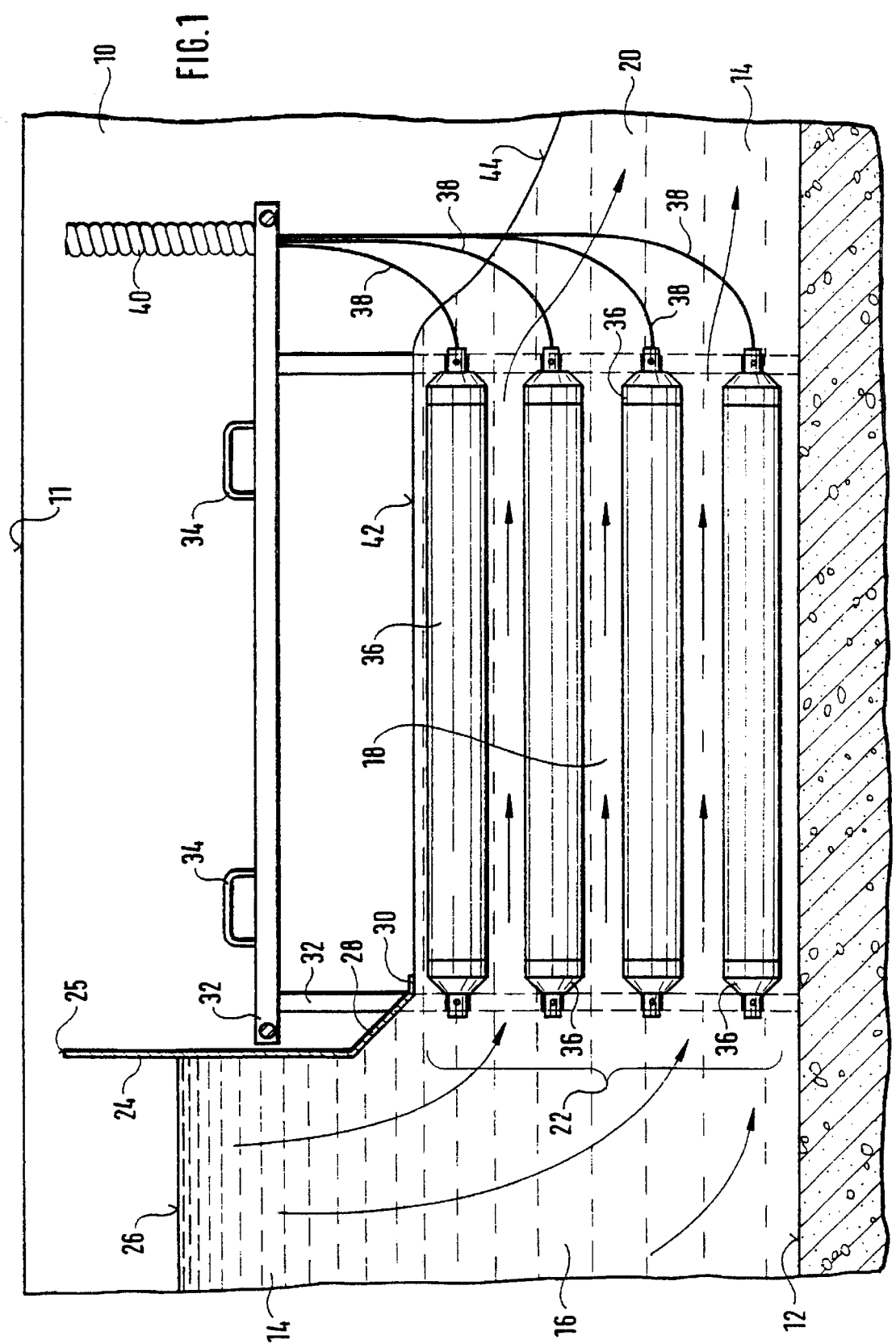

DEVICE AND METHOD FOR EXPOSING LIQUIDS, INCLUDING PRETREATED WASTEWATER, TO X-RAYS

This invention concerns a device for UV irradiation of liquid media according to the definition of the species of Patent claim 13, and it also concerns a method of UV irradiation of liquid media.

A device for UV irradiation of liquid media and a method of UV irradiation of liquid media are known from the document WO 94/20208. In the direction of flow of the liquid medium, this device includes an inlet chamber, an irradiation chamber and an outlet chamber. The irradiation chamber contains UV radiation sources formed by UV lamps surrounded by safety tubes which are permeable for UV radiation and which shield the UV lamps with respect to the liquid. The UV radiation sources extend in rows side by side and/or one above the other parallel to the direction of flow of the liquid medium.

With the known device, the irradiation chamber is designed as a chamber that is closed on all sides in the manner of a tube. The liquid medium is forced through this irradiation chamber or through this tube with a certain pressure. This leads to an increased flow rate in the irradiation chamber.

Although UV irradiation of liquid media is possible with the known device, and in particular UV irradiation of prepurified wastewater is possible with this device, it has been found that the design of the irradiation chamber as a chamber that is closed on all sides is complicated and expensive.

In practice, however, such devices which are designed in the manner of a trough or a channel that is open at the top can be manufactured less expensively; in other words, the irradiation chamber is not closed on all sides, but instead it is open at the top. However, this has the disadvantage that with an open channel, only a low flow rate of the liquid medium can be achieved and thus only a low efficiency is possible.

In the document German Patent No. 42 06 596 A1, devices with an open channel are mentioned in the introduction to the description, and it is stated there that such devices have shortcomings, although these shortcomings are not specified further. Therefore, it is proposed in the aforementioned German Patent No. 42 06 596 A1 that at least the UV irradiation sources be covered and that a closed flow-through channel be formed which does not have any free water surface. An overflow dam achieves the result that the lower side of the cover is always below the dammed-up water level, so that at all flow rates, the UV irradiation sources are wetted by the liquid medium without any air inclusions.

The object of this invention is to provide a device for UV irradiation of liquid media which will permit high flow rates and thus an improved efficiency in operation of the device even with an open channel, and which will be both inexpensive and economical to manufacture and can also be operated easily, and simple operation must,also include the fact that individual UV radiation sources must be replaced at certain intervals and to this end they must be easily accessible. In addition, this invention should create a simplified and inexpensive method to accompany the device for UV irradiation of liquid media.

With regard to the device, the object of this invention is achieved through the features of Patent claim 13.

With this invention, the complete device is to be designed in the manner of a channel-like trough that is open at the top and is preferably rectangular, so that the irradiation chamber is also open at the top. Thus, the UV irradiation sources are readily accessible for repair purposes.

Between the inlet chamber and the irradiation chamber, there is a damming wall across the direction of flow of the liquid medium, its dimensions being selected so that the damming wall partially covers the cross section of the channel, with the damming wall extending over the entire width of the channel and the lower edge of the damming wall being located at a distance from the base of the channel. This creates an outflow opening for the liquid medium from the inlet chamber to the irradiation chamber.

This outflow opening is designed with dimensions according to this invention so that the liquid medium dams up in front of th e outlet opening with an increased flow of liquid medium on reaching a flow rate of more than 1 m/sec.

Therefore, the liquid medium in the inlet chamber assumes a liquid level greater than the level of the liquid medium in the irradiation chamber.

On the basis of the increased liquid level in the inlet chamber and the dammed up liquid, an increased pressure is established, leading to the liquid medium flowing through the irradiation chamber at an increased rate.

A corresponding increased rate of the liquid medium in the irradiation chamber is possible even with the known device with the irradiation chamber that is closed on all sides, but such an increased rate has not so far been possible with devices designed as an open channel. Up to low flow rates of less than approximately 1 m/sec, the open channel according to this invention functions practically without any damming wall, i.e., up to a flow rate of approximately 1 m/sec, operation without any damming wall is possible. However, if the flow rate is increased because of a larger volume of liquid medium, this results in the damming effect in front of the damming wall in the inlet chamber as described above, with the advantageous effect that greater flow rates are established in the irradiation chamber.

Another feature of this invention is that the lower part of the damming wall is bent at an angle of less than 90 degrees in the direction of flow of the liquid medium, thus forming a face running at an inclination to the direction of flow. This inclined face practically forms a flow rectifier which leads to calming or a directed flow of the liquid medium.

With this invention, the inclined face is followed by a short outflow baffle running horizontally and parallel to the direction of flow of the liquid medium. This outflow baffle determines the level of the liquid medium in the irradiation chamber is predetermined, because following the inlet chamber, the liquid medium in the irradiation chamber flows at a uniform liquid level to the outlet chamber.

With the known device described above, the liquid medium is forced through a channel that is closed on all sides, and the liquid level in the irradiation chamber is limited by the dimensions of the channel, but the liquid medium in this invention is guided only through the outflow opening which is adjustable by the damming wall. After the liquid medium has passed through the outflow opening, it flows through the irradiation chamber with a liquid level running parallel to the bottom of the channel, said level being determined by the outflow baffle connected to the flow rectifier.

An optimum efficiency and a maximum throughput of the device are achieved with this invention on reaching a flow rate of approximately 4 m/sec, i.e., with a change in the liquid medium from pure flow to so-called supercritical flow. The throughput indicates the amount of liquid medium flowing through the irradiation chamber per unit of time.

Thus with this invention, the possibility that the liquid medium flows through the irradiation chamber at an increased rate is created in a novel manner, which leads to an increased efficiency of the device without requiring the irradiation chamber to be designed as a tube that is closed on all sides. The high speeds of the liquid medium achieved in the irradiation chamber with the device according to this invention were not previously possible in devices with an open channel.

Another important advantage of this invention that can be mentioned is that the dimensions of the damming wall in the open channel are selected so that flooding of the device can occur with extremely large quantities of the liquid medium, such as those occurring at high water and with heavy rainfall. This takes place as the large quantity of liquid flows over the top overflow edge of the damming wall in the inlet chamber and passes through the irradiation chamber into the outlet chamber. According to an expedient embodiment of this invention, the upper edge of the damming wall ends below the upper edge of the channel, so that the liquid medium can flow over the overflow edge of the damming wall and through the irradiation chamber into the outlet chamber.

According to another expedient embodiment of this invention, the inclined face is followed by a short outflow baffle running horizontally and parallel to the direction of flow of the liquid medium. Due to this outflow baffle, the level of the liquid medium in the irradiation chamber is predetermined, because following the inlet chamber, the liquid medium flows at a uniform liquid level in the irradiation chamber to the outlet chamber.

Thus, with the known device described above, the liquid medium is forced through a channel that is closed on all sides and the liquid level in the irradiation chamber is limited by the dimensions of the channel, but the liquid medium in this invention is guided only through the outlet opening which is adjustable by the damming wall. After the liquid medium has passed through the outlet opening, it flows through the irradiation chamber with a liquid level which runs parallel to the bottom of the channel and is determined by the outflow baffle connected to the flow rectifier.

Another expedient design of this invention provides for an adjustable and lockable dam to be provided in the outflow chamber arranged vertically to the direction of flow of the liquid medium. The dimensions of the dam are selected so that the dam can cover the cross section of the channel at the height of the front outlet opening, with the lower edge of the dam being located at a distance from the bottom of the channel. The lower edge of the dam can either be moved downward toward the bottom of the channel or upward to the height of the front outlet opening and locked there, depending on the throughput or the flow rate of the liquid medium.

This dam is especially advantageous in those cases where the quantity or throughput of liquid medium to be processed is so small that there is no buildup of liquid medium in the inlet chamber due to the damming wall. An outlet opening is formed between the lower edge of the dam and the bottom of the channel, and the vertically adjustable dam offers a possibility of adjusting this outlet opening so that liquid can be dammed up despite the small quantity of liquid medium. This damming has the effect that a sufficiently high liquid level of the liquid medium is achieved in the irradiation chamber, with the liquid level being sufficient so that the upper UV lamps arranged in the irradiation chamber will always be surrounded by the liquid medium, so that these UV lamps are not allowed to become dry. This yields the result that all UV lamps in the irradiation chamber can remain in operation even when there is only a small amount of liquid medium and the good efficiency of the device is maintained.

According to another expedient embodiment of this invention, the dam begins to function at a low throughput with a flow rate of less than 1 m/sec, i.e., when the liquid level drops below the height of the outflow baffle. In this case, the liquid medium is dammed up in front of the dam and thus also in the irradiation chamber, so the liquid level of the liquid medium in the irradiation chamber remains high enough for all the UV lamps to be surrounded by the liquid medium.

It is especially expedient that the lower edge of the dam is designed with a sawtooth profile. If the lower edge is not straight but instead has a sawtooth profile, the liquid dammed up when the dam is functioning is calmed and instead it is dammed up slowly and not suddenly, so that the flow conditions in the irradiation chamber are not disturbed much and they remain essentially constant.

According to another advantageous embodiment of this invention, the UV lamps in the irradiation chamber are formed by medium-pressure mercury discharge lamps. Such medium-pressure mercury discharge lamps have a high radiation power and are thus especially suitable for UV irradiation of the liquid medium, taking into account the fact that the liquid medium flows through the irradiation chamber according to this invention at a high rate.

It is especially expedient if the medium-pressure mercury discharge lamps have a diameter of at least 18 mm and if the diameter of the safety tubes surrounding the medium-pressure mercury discharge lamps is larger by a factor of at least 2.2. It has been found in experiments that the efficiency of the device is especially advantageous at these dimensions of the UV radiation lamps.

Despite the high speeds flow rate of the liquid medium in the irradiation chamber, in another expedient embodiment according to this invention, UV lamps formed by low-pressure mercury discharge lamps can also be used, and in an advantageous manner the low-pressure mercury discharge lamps have a diameter of at least 25 mm, and the diameter of the protective tubes surrounding the low-pressure mercury discharge lamps is greater by a factor of at least 1.7. In extensive experiments, it has been found that in such a case, low-pressure mercury discharge lamps can also be used to advantage with the device according to the present invention.

With regard to the method of UV irradiation of liquid media, the object of the present invention is achieved through the features of Patent claim 22.

The method according to this invention provides for the liquid medium to flow through such an inlet chamber, such an irradiation chamber and such an outflow chamber, each being designed in the manner of a channel that is open at the top. Furthermore, the liquid level of the liquid medium in the inlet chamber is influenced in such a way and is dammed up between the inlet chamber and the irradiation chamber by means of a damming wall, where the damming wall largely covers the cross section of the channel and the lower edge of the damming wall is at a distance from the bottom of the open channel, forming an outflow opening, such that above a flow rate of the medium in the outflow opening of approximately 1 m/sec, the level of the liquid medium in the inlet chamber is greater than the level of the liquid medium in the irradiation chamber, and the liquid medium is guided to the outlet chamber with a uniform level following the inlet chamber.

With this invention, there is a damming up of the liquid medium in front of the damming wall in the inlet chamber, which results in the liquid medium flowing through the irradiation chamber at an increased rate but at a uniform level, thereby increasing the efficiency of the device as a whole.

This invention will now be explained in greater detail below on the basis of the embodiments illustrated in the drawings, which show:

FIG. 1 a schematic side view of a first embodiment of this invention, and

Figure 2:
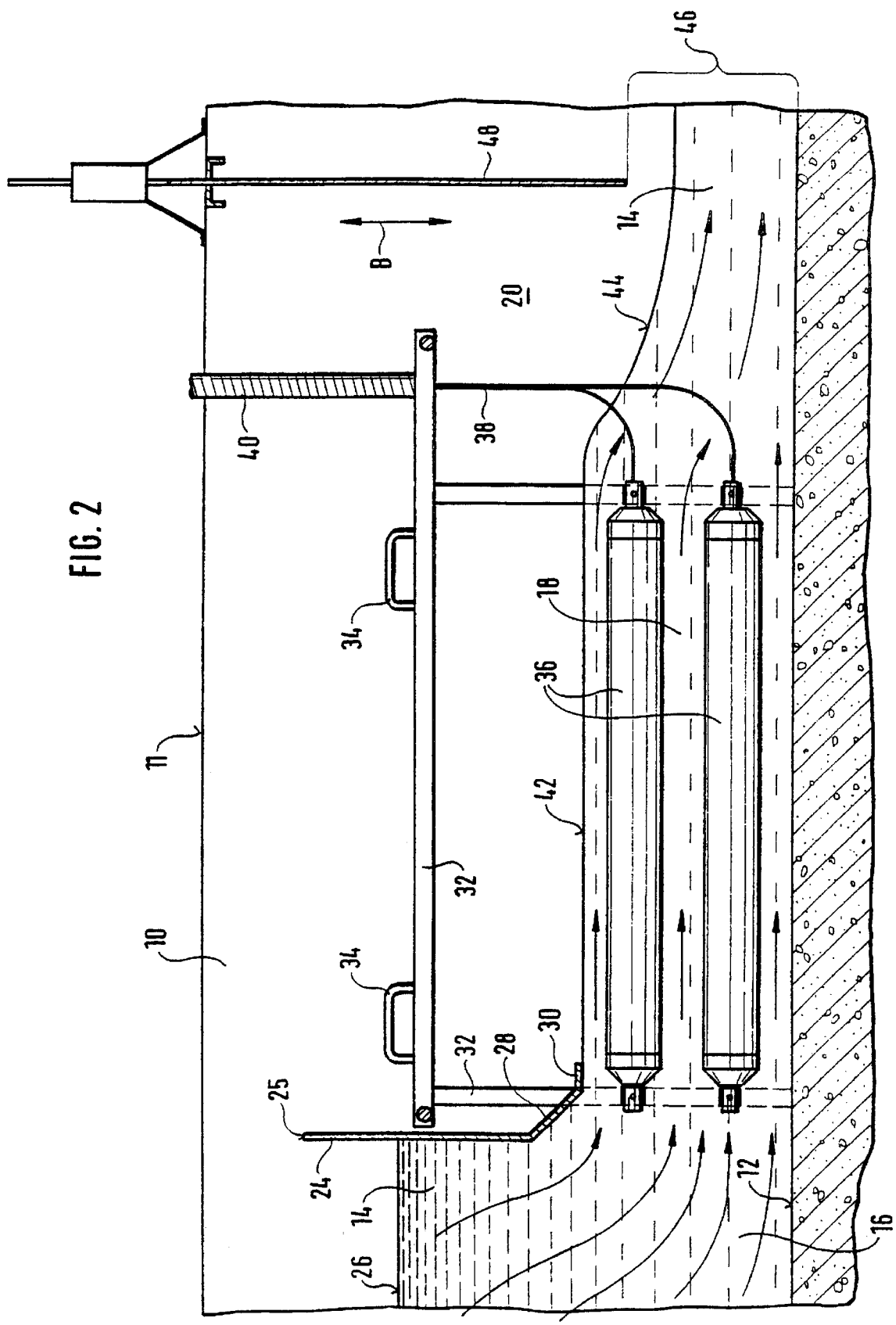

FIG. 2 a schematic side view of the additional embodiment of the device according to this invention.

The device according to FIG. 1 is formed by an open channel 10 with a rectangular cross section. Since the channel 10 is open at the top, it has only two side walls and a bottom 12. Prepurified wastewater 14 which is exposed to UV irradiation flows in the channel 10.

As seen in the direction of flow of the wastewater 14, the device includes an inlet chamber 16, an irradiation chamber 18 and an outlet chamber 20. There are several UV radiation sources 36 in the irradiation chamber 18, arranged in rows side by side and one above the other, parallel to the direction of flow of wastewater 14. Between the individual UV radiation sources 36 there is a certain distance so that the wastewater 14 can flow through the irradiation chamber 18 and be exposed to UV irradiation in the process.

The UV radiation sources 36 consist in a known manner of the actual UV lamps which are surrounded with protective tubes that are permeable for UV radiation to shield them against the wastewater 14. Electric lines 38 for operation of the UV lamps lead through waterproof connections through a common tube 40 to a power supply unit (not shown here) The individual UV radiation sources 36 are arranged and mounted in a frame-like holder 32, and the entire group of UV radiation sources 36 can be inserted into the irradiation chamber 18 and removed from it by means of handles 34 together with the holder 32.

At the entrance of the irradiation chamber 18 there is a damming wall 24. At the lower end, damming wall 24 has an inclined face 28 which is connected to a short outflow baffle 30 which runs parallel to the direction of flow of the wastewater 14 and runs parallel to the bottom 12 of the channel.

The damming wall 24 extends perpendicular to the plane of the drawing over the entire cross section of the channel 10, and an outlet opening 22 is formed by the lower side of the damming wall 24 and by the distance between the outflow baffle 30 and the bottom 12 of the channel. The damming wall 24 has the effect that wastewater 14 can flow into the irradiation chamber 18 only through this outlet opening 22. Wastewater 14 is dammed up in front of damming wall 24 because the cross section of the outlet opening 22 is smaller than the cross section of the channel 10, so that the liquid level 26 of the wastewater 14 in the inlet chamber 16 is higher than the liquid level 42 in the irradiation chamber 18. This damming effect is thus established when the velocity of flow of the wastewater exceeds a value of approximately 1 m/sec because of large quantities of wastewater.

Due to the damming up of the wastewater 14 in front of the damming wall 24 and due to the pressure difference between the liquid levels 26 and 42, the wastewater 14 flows through the irradiation chamber 18 at an increased flow rate. The short outflow baffle 30 ensures that the liquid level 42 of the wastewater 14 in the irradiation chamber 18 will remain at the level of the outflow baffle 30 or will run parallel to the bottom 12 of the channel.

After passing through the irradiation chamber 18, the wastewater 14 exposed to the UV irradiation enters the outlet chamber 20 and can flow out of it unhindered as clean wastewater. In doing so, the liquid level 44 of the wastewater 14 in the outlet chamber drops in comparison with the level 42 in the irradiation chamber because the wastewater 14 can now flow out freely and unhindered.

In operation of this device, it must be recalled that on entering the irradiation chamber 18, the wastewater 14 encounters various obstacles which are formed by the frame parts 32 and by the end faces of the UV radiation sources. These parts present a resistance to the flowing wastewater 14.

It is advantageous here to arrange the above-mentioned parts at the left in the drawing, i.e., in front of the outflow baffle 30. This achieves the result that despite these parts in the irradiation chamber 18, a uniform flow is achieved and the flow profile in the irradiation chamber 18 does not suffer from a negative influence. If parts of the holder 32 must penetrate the inclined face 28, corresponding slots and orifices which can be covered again subsequently are provided in the inclined face 28.

With the device according to FIG. 1 described so far, it is assumed that the quantity of wastewater 14 is so great that the wastewater 14 can be dammed up in front of the damming wall 24, and thus there can be an increased flow rate of the wastewater 14 in the irradiation chamber 18. In dry periods, however, the case can also occur that the quantity of wastewater 14 is low, so that there cannot be any damming by the damming wall 24 and there is even a risk that the UV radiation sources 36 at the top of the irradiation chamber 18 are no longer surrounded by the wastewater 14 and begin to dry out.

To prevent this, a dam 48 is provided in the rear outlet chamber 20 in the embodiment of the device according to this invention in FIG. 2, and the double arrow B indicates that the dam 48 runs vertically and is adjustable and lockable in the direction perpendicular to the direction of flow of the wastewater 14.

Like the damming wall 24, the dam 48 partially fills the cross section of the channel 10, with a small outflow opening 46 remaining through the lower edge of the dam 48 and the bottom 12 of the channel 10.

With only small quantities of wastewater 14, the outflow opening 46 can be adjusted by vertical adjustment of the dam 48 so that only a small amount of wastewater 14 can flow out and thus there is a damming effect, when the quantity of wastewater 14 flowing out through the outflow opening 46 is smaller than the quantity of wastewater 14 entering the inlet chamber 16. This damming effect results in wastewater 14 being dammed up in the inlet chamber 16 in front of the damming wall 24 in a desired manner, and wastewater 14 flows around all the UV radiation sources 36.

If the lower edge of the dam 48 is above the height of the lower edge of the damming wall 24, the dam 48 is practically non-functioning. Then the liquid level 42 of the wastewater 14 in the irradiation chamber 18 is high enough for all the UV radiation sources 36 to be washed by the wastewater 14. Only at a lower throughput of wastewater 14 with a flow rate of less than 1 m/sec, i.e., when the liquid level drops below the height of the outflow baffle 30 does the dam 48 begin to function as a dam.

In the embodiment of this invention according to FIG. 1 and in that according to FIG. 2, the upper overflow edge 25 of the damming wall 24 is below the lower edge 11 of the channel 10. When the channel 10 is flooded when there are very large quantities of wastewater 14, e.g., in high water and when there is heavy rainfall, thus the large quantity of wastewater (14) can go over the upper overflow edge (25) of the damming wall (24) and through the irradiation chamber (18) into the outlet chamber (20).

What is claimed is:

1. A device for UV irradiation of liquid media (14), where the device has an inlet chamber (16), followed by an irradiator chamber (18) and then an outlet chamber (20), and where UV irradiation sources (36) of UV lamps with protective tubes surrounding the UV lamps and shielding them from the liquid medium (14) are provided in the irradiation chamber (18), said UV lamps being arranged in rows side by side and/or one above the other parallel to the direction of flow of the liquid medium (14), characterized in that the device is open at the top and is rectangular; a damming wall (24) is provided between the inlet chamber (16) and the irradiation chamber (18) across the direction of flow of the liquid medium (14), the dimension of this wall being selected so that the damming wall (24) substantially covers the cross section of the channel (10), and its lower edge is at a distance from the bottom (12) of the open channel (10), thus creating an outflow opening (22) for the liquid medium (14) from the inlet chamber (16) to the irradiation chamber (18); the size of the outflow opening (22) is such that when the flow of the liquid medium (14) is increased and when a velocity of flow of more than 1 m/sec is reached, the liquid medium (14) is dammed up in front of the outflow opening (22), and a higher liquid level develops in the inlet chamber (16) than the liquid level of the liquid medium (14) in the irradiation chamber (18); the lower part of the damming wall (24) in the direction of flow of the liquid medium (14) is bent at an angle of less than 90° in the direction of flow, thus forming a face (28) running at an inclination to the direction of flow, and an outflow baffle (30) running horizontally and parallel to the direction of flow of the liquid medium (14) is connected to the inclined face (28).

2. A device according to claim 1, characterized in that an upper overflow edge (25) of the damming wall (24) ends below the upper edge (41) of the channel (10).

3. A device according to claim 1, characterized in that an adjustable and lockable dam (48) is provided in the outlet chamber (20) vertical to the direction of low, its dimensions being selected so that the dam (48) can cover the cross section of the channel (10) at the height of the front outflow opening (22), and its upper edge is movable either downward toward the bottom (12) of the channel or upward to the height of the front outflow opening (22) and locked there as a function of the throughput or the flow rate of liquid medium.

4. A device according to claim 3, characterized in that the lower edge of the dam (48) has a sawtooth profile.

5. A device according to claim 1, characterized in that the UV lamps are medium-pressure mercury discharge lamps.

6. A device according to claim 5, characterized in that the medium-pressure mercury discharge lamps have a diameter of at least 18 mm, and the diameter of the protective tubes enclosing the medium-pressure mercury discharge lamps is greater by a factor of at least 2.2.

7. A device according to claim 1, characterized in that the UV lamps are low-pressure mercury discharge lamps.

8. A device according to claim 7, characterized in that the low-pressure mercury discharge lamps have a diameter of at least 25 mm, and the diameter of the protective tubes surrounding the low-pressure mercury discharge lamps is larger by a factor of at least 1.7.

9. A method of UV irradiation of liquid media, where the liquid medium flows in succession through an inlet chamber, an irradiation chamber and an outlet chamber, where UV irradiation sources consisting of UV lamps with protective tubes surrounding the UV lamps and shielding them from the liquid medium are provided in the irradiation chamber, and are arranged in rows side by side and/or one above the other, parallel to the direction of flow of the liquid medium, wherein the method comprises providing liquid medium to an irradiation chamber and an outflow chamber so that said liquid medium flows through such an irradiation chamber and such an outflow chamber which is open at the top; damming up the liquid level of the liquid medium in the inlet chamber between the inlet chamber and the irradiation chamber by means of a damming wall that covers most of the cross section of the channel, and its lower edge is at a distance from the bottom of the open channel to form an outflow opening; generating a flow rate of the liquid medium in the irradiation chamber on more than approximately 1 m/sec, wherein the liquid level in the inlet chamber is greater than the liquid level of the liquid medium in the irradiation chamber; and guiding the liquid medium to the outflow chamber at a uniform level following the inlet chamber.

* * * * *